Patented May 2, 1939

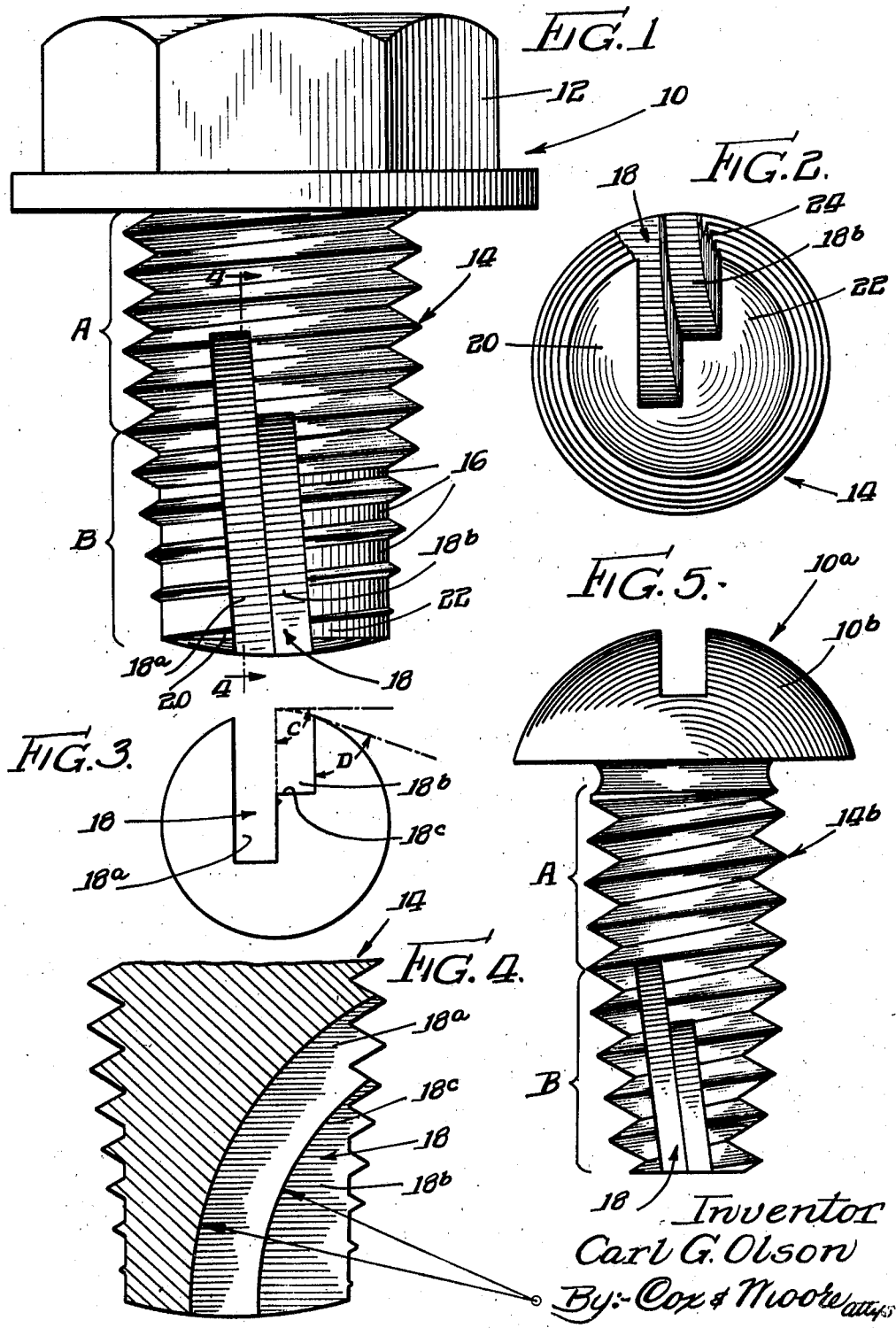

2,156,350

UNITED STATES PATENT OFFICE 2,156,350

FASTENER

Carl G. Olson, Chicago, Ill., assignor to Illinois Tool Works, Chicago, Ill., a corporation of Illinois Application April 19, 1937, Serial No. 137,721

10 Claims. (Cl. 85—47)

This invention relates generally to fasteners, and more particularly to fasteners of the self-tapping type.

It is an important object of the present invention to provide in a screw designed to cut its own thread in relatively hard material, a cutting edge which is more effective in cutting away material than cutting edges of commercial screws with which I am familiar.

More specifically, the invention contemplates the provision of a cutting edge which is relatively sharp and to this end I propose to provide a screw body with a novel recess arrangement.

Still more specifically, this invention contemplates a self-tapping screw, as above set forth, in which one section of the screw disposed adjacent a longitudinally extending recess is adapted to yield toward a rigid section provided with a relatively sharp serrated cutting edge.

The foregoing and other objects and advantages will be more apparent from the following detailed description when considered in connection with the accompanying drawing, wherein—

Figure 1 is a side elevational view of a self-tapping screw embodying features of my invention;

Figure 2 is a bottom end elevational view of the screw body shown in Figure 1 to more clearly illustrate the arrangement of the lonigtudinally extending recess;

Figure 3 is a diagrammatic representation of the entering end of the screw to more clearly illustrate the acute cutting edge provided on the screw which is constructed in accordance with the teachings of the present invention;

Figure 4 is a fragmentary longitudinal sectional view of the screw taken substantially along the line 4—4 of Figure 1; and Figure 5 is a screw embodying features of the present invention, said screw having a thread arrangement at the entering end which structurally differs from the screw shown in Figure 1.

Referring now to the drawing more in detail wherein like numerals have been employed to designate similar parts throughout the various views, it will be seen that one embodiment of my invention is represented by a self-tapping screw designated generally by the numeral 10 in Figure 1. This screw is provided with any suitable type of head 12 which, in the present embodiment, is of the hexagonal washer head type. Formed integral with the screw head 12 is a threaded body portion 14. In the disclosed embodiment the thread on the body 14 extending along the portion indicated by the bracket A is of a conventional machine screw type and is of constant height and crest diameter. By conventional machine screw type I mean the standard or usual V-shaped threads which are commonly referred to by the trade and in handbooks as machine screw type threads. The thread convolutions embraced by the bracket B decrease in external diameter, but conform in cross sectional contour with the corresponding portions of the thread convolutions on the holding portion A. The portion B is the thread-forming or tapping portion and is provided with the decrease in crest diameter to facilitate initial application thereof to the unthreaded aperture of a work piece.

The axial pitch of the crest of the thread on both the holding and tapping portions is uniform and the crown of the thread convolutions is uniform throughout the entire length of the screw. In the screw embodiment shown in Figure 1, exposed peripheral core portions 16 are presented which increase in axial width toward the entering end of the screw, said core portions conforming in diameter to the constant root diameter of the thread on the holding portion A.

Particular attention is directd to a longitudinal recess indicated generally by the numeral 18. This recess 18 is comprised of two recess sections 18a and 18b and is positioned to one side of the screw axis in order to render a section 20 of the screw yieldable. The opposite section 22 of the screw is substantially rigid and the only purpose in providing the recess section 18b is to increase the acuteness of the serrated cutting edge 24 extending along the rigid screw section 22.

When the screw is initially applied to the unthreaded aperture of a work piece, the section 20 yields toward the section 22 and in this manner increases the cutting effectiveness of the cutting edge 24. Employing the recess section 18b, the angularity of the cutting edge is increased from the substantially right angle indicated by the letter C in Figure 3 to an acute angle represented by the letter D in Figure 3. This increased sharpness of the cutting edge materially enhances the cutting effectiveness of the screw in the work. While screws having cutting edges of the angularity indicated by the letter C (Figure 3) are very practical and satisfactory when used in most materials, it has been found that such screws do not cut as freely in certain other materials, such as fiber or substances made of compressed cloth, et cetera. As an example of such material, I call attention to cloth compositions used with a suitable binder such as shellac and other resinous materials. By having the screw provided with the acute angle D, sufficient increase in cutting effectiveness is obtained to render the screw freely insertable within fibrous and other similar materials.

The recess 18 may be referred to as a stepped slot for the reason that the shallower recess 18b provides a step 18c. I prefer to form the recess 18 by the use of rotary cutters, the radii of which are indicated in Figure 4. The cutter used in forming the recess section 18a has a larger radius than the cutter employed to form the recess section 18b. By making the recess section 18b relatively shallow, the rigidity of the screw section 22 is maintained and this is desirable from the standpoint of satisfactory functioning. In the slotting of these screws I am able to employ two adjacently positioned cutters which rotate together as a unit and this method of procedure can be carried out in a very satisfactory and economical manner.

In Figure 5 a slightly modified tapping screw, designated generally by the numeral 10a, is shown, and this screw is provided with a conventional head 10b formed integral with a threaded body 14b. The screw 10a is provided with a recess 18 which is identical with the recess 18 previously described in connection with the screw 10. The srew 10a differs from the screw 10 in that the thread on the tapping portion is constant in height, although the crest diameter thereof decreases toward the entering end of the screw.

From the foregoing it will be apparent that by employing the novel recess arrangement described herein, the cutting effectiveness and the consequent practical utility of the screw is materially enhanced. Conventional machine shop methods may be employed in the manufacture of the screw with the utmost economy and speed. The recess is so disposed as to expedite the disposition of chips formed during the cutting operation. The increase in width at the periphery affords more space to receive the chips, and the curved bottom surfaces or walls of the recess sections serve to direct the chips axially of the screw. Obviously the invention is not limited to the particular type of tapping screw disclosed herein, but is capable of numerous other applications and modifications, said invention being limited only by the scope of the appended claims.

Having thus described my invention, what I claim as new and desire to secure by Letters Patent is:

1. A thread cutting fastener including a body portion provided with a thread, said body portion being divided into a pair of sections by a longitudinal recess, said recess comprising two communicating recess portions of differing depths, one of said sections being positioned adjacent the recess portion of less depth and having a cutting edge and the other section being yieldable for increasing the cutting effectiveness of the edge on said first mentioned section.

2. A thread cutting fastener including a body portion provided with a thread, said body portion being divided into a pair of sections by a longitudinal recess, said recess having parallel side walls, one of said sections having an acute serrated cutting edge at the entering end of the fastener and the other section being yieldable for increasing the cutting effectiveness of the edge on said first mentioned section, thread convolutions decreasing in external diameter toward the entering end of the fastener to facilitate application thereof to an unthreaded aperture in a work piece.

3. A tapping fastener including a body portion provided with a thread, said body portion being divided into a pair of sections by a longitudinal stepped recess, said recess providing an acute cutting edge on the section adjacent the shallower step which is adapted to cut away material when the fastener is turned within an unthreaded aperture of a work piece.

4. A tapping fastener including a body portion provided with a thread, said body portion being divided into a pair of sections by a longitudinal recess, said recess having a depth greater than the radius of the threaded body at the entering end of the fastener and providing an acute serrated cutting edge on one of said sections at the entering extremity of the fastener which is adapted to cut away material when the fastener is turned within an unthreaded aperaure of a work piece, thread convolutions decreasing in external diameter toward the entering end of the fastener whereby to facilitate application thereof to an unthreaded aperture in a work piece.

5. A tapping fastener including a body portion provided with a thread, said body portion being divided into a pair of sections by a longitudinal recess, said recess having a depth greater than the radius of the threaded body at the entering end thereof and widening at the periphery of said body to provide an acute cutting edge on one of said sections at the entering extremity of the fastener which is adapted to cut away material when the fastener is turned within an unthreaded aperture of a work piece, thread convolutions decreasing in external diameter toward the entering end of the fastener whereby to facilitate application thereof to an unthreaded aperture in a work piece.

6. A tapping fastener including a body portion provided with a thread, said body portion being divided into a pair of sections by a longitudinal recess, said recess having a depth greater than the radius of the threaded body at the entering end of the fastener and comprising communicating recess portions of different depths to provide an acute cutting edge on the section adjacent the recess portion of less depth which is adapted to cut away material when the fastener is turned within an unthreaded aperture of a work piece.

7. A tapping fastener including a body portion provided with a thread, said body portion being divided into a pair of sections by a longitudinal recess, the bottom of said recess being stepped and curved longitudinally of the screw and providing an acute cutting edge on the section adjacent the shallower step of the recess whereby to enable the removal of material when the fastener is turned within an unthreaded aperture of a work piece.

8. A tapping fastener including a body portion provided with a thread, said body portion at the entering end being divided into a pair of sections by a longitudinal recess, said recess including communicating recess portions of different depths, the bottom surfaces of said recess portions being coaxially disposed, the section adjacent the shallower recess portion having an acute cutting edge.

9. A tapping fastener including a body portion provided with a thread, said body portion at the entering end being divided into a pair of sections by a longitudinal recess, said recess including communicating recess portions of different depths, the bottom surfaces of said recess portions being coaxially disposed, the bottom and side walls of said recess providing rectangular corners along the bottom of said recess, the section adjacent the shallower recess portion having an acute cutting edge.

10. A tapping fastener including a body portion provided with a thread, said body portion being divided into a pair of sections by a longitudinal recess, said recess comprising communicating recess portions, one portion being deeper than the other, the side walls defining said recess portions being parallel and the bottom surface of each recess portion conforming with the arc of a circle and joining a companion side wall so as to provide a rectangular corner, the section adjacent the shallower recess portion having an acute cutting edge.

CARL G. OLSON.